US008472999B2

(12) United States Patent
Zhang

(10) Patent No.: US 8,472,999 B2
(45) Date of Patent: Jun. 25, 2013

(54) METHOD AND SYSTEM FOR ENABLING DUAL STANDBY STATE IN A WIRELESS COMMUNICATIONS SYSTEM

(75) Inventor: Xuejun Zhang, Shanghai (CN)

(73) Assignee: ST-Ericsson SA, Plan-les-Outes (CH)

( * ) Notice: Subject to any disclaimer, the term of this patent is extended or adjusted under 35 U.S.C. 154(b) by 590 days.

(21) Appl. No.: 12/261,752

(22) Filed: Oct. 30, 2008

(65) Prior Publication Data
US 2009/0131054 A1 May 21, 2009

(30) Foreign Application Priority Data
Oct. 31, 2007 (CN) .......................... 2007 1 0167966

(51) Int. Cl.
H04M 1/00 (2006.01)
(52) U.S. Cl.
USPC .................... 455/552.1; 455/436; 455/558
(58) Field of Classification Search
USPC ........................ 455/436, 552.1, 558
See application file for complete search history.

(56) References Cited

U.S. PATENT DOCUMENTS

| 2004/0137903 A1* | 7/2004 | Park .............................. 455/436 |
| 2005/0208965 A1* | 9/2005 | Nakajima ................... 455/552.1 |
| 2006/0095600 A1* | 5/2006 | Lee et al. ......................... 710/14 |
| 2007/0004457 A1* | 1/2007 | Han .............................. 455/558 |
| 2007/0049216 A1* | 3/2007 | Karaoguz .................... 455/90.3 |
| 2008/0064443 A1* | 3/2008 | Shin et al. ..................... 455/558 |
| 2008/0081659 A1* | 4/2008 | Lim ............................ 455/552.1 |
| 2008/0102847 A1* | 5/2008 | Kim et al. ..................... 455/450 |
| 2008/0161050 A1* | 7/2008 | Shudark et al. ............... 455/558 |

FOREIGN PATENT DOCUMENTS

CN 1671232 A 9/2005

* cited by examiner

Primary Examiner — Joseph Chang
Assistant Examiner — Jeffrey Shin
(74) Attorney, Agent, or Firm — Howison & Arnott, L.L.P.

(57) ABSTRACT

A system and method having a multimode wireless communication terminal with at least two SIM card slots for use with at least two phone numbers simultaneously online (dual standby). The system includes a main controller, a primary mode module, a secondary mode module, and an inter-system measurement module. The main controller operates the multimode wireless communication terminal in single standby or dual standby state. The primary mode module enables the primary mode of operation for the multimode wireless communication terminal. The primary mode of operation is a default mode of operation. The secondary mode module enables the secondary mode of operation for the multimode wireless communication terminal. Paging information for the primary mode of operation and the secondary mode of operation are monitored at their respective monitoring rates using a TDM method. Switching between the primary and secondary modes of operation is executed by an inter-system handover module. During the dual standby state, both the inter-system measurement and handover are initiated by the terminal itself. The multimode wireless communication terminal is used in a multimode wireless communication system.

19 Claims, 7 Drawing Sheets

METHOD AND SYSTEM FOR ENABLING DUAL STANDBY STATE IN A WIRELESS COMMUNICATIONS SYSTEM

CROSS-REFERENCE TO RELATED APPLICATION(S) AND CLAIM OF PRIORITY

This application claims the benefit under 35 U.S.C. §119 (a) to a Chinese patent application filed in the State Intellectual Property Office of the People's Republic of China on Oct. 31, 2007 and assigned Serial No. 200710167966.4, the entire disclosure of which is hereby incorporated by reference.

TECHNICAL FIELD OF THE INVENTION

The invention relates generally to wireless communication systems and, more particularly, to implementing a dual standby state enabled wireless communication terminal.

BACKGROUND OF THE INVENTION

With the development of mobile communication systems, several wireless communication standards (i.e., wireless communication schemes) have been developed. Some exemplary wireless communication schemes include global system for mobile communications (GSM), personal digital cellular (PDC), and cdmaOne (IS-95), which are second generation (2G) wireless communication schemes. Other exemplary wireless communication schemes include time division-synchronous code division multiple access (TD-SCDMA), wideband CDMA (W-CDMA or WCDMA), and CDMA2000, which are third generation (3G) wireless communication schemes. Other exemplary wireless communication schemes include general packet radio service (GPRS), and Enhanced Data Rates for GSM Evolution (EDGE), which are from-2G-to-3G wireless communication schemes. Wireless local area network (WLAN) is another popular wireless communication scheme.

Some conventional wireless communication devices are designed to operate with multiple wireless communication schemes. As an example, a traditional W-CDMA/GSM terminal is used to provide 2G/3G network coverage and/or load balancing. As both the GSM and W-CDMA operabilities belong to one operator (or based on the roaming agreement between operators), the conventional W-CDMA/GSM terminal has only one subscriber identity module (SIM) card slot for one subscription, and only one phone number is used. Consequently, a conventional W-CDMA/GSM terminal does not transmit and receive in both modes at the same time.

As an alternative, where dual SIM card slots are implemented for two subscriptions (i.e., one SIM card slot is for a GSM operator, and the other SIM card slot is for a different W-CDMA operator), then the dual standby terminal operates with two phone numbers online at the same time. However, the simultaneous transmitting of one mode and the receiving of another mode would lead to detrimental radio frequency (RF) interference. Moreover, implementing a dual standby terminal with two chipsets (i.e., one chipset for each mode) would increase the cost and size of the dual standby terminal and decrease performance.

Designed to operate in a single mode at a time, the conventional terminal, including its processing power, memories, buffers, and timing controls, is tailored to a single mode running requirement. If two modes attempt to run at the same time in a dual standby manner, the conventional terminal architecture would not support such operability.

Additionally, it should be noted that inter-system measurements are not active all the time in a traditional single standby terminal. FIG. 1 depicts an exemplary paging scheme 10 for a conventional single standby wireless terminal. In particular, the conventional terminal receives paging information 12 for the active mode on a regular basis, but only receives the inactive mode's network signal 14 when the inter-system measurement is executed. The inter-system measurements are triggered by a vendor-specific algorithm implemented at a base station such as a radio network controller (RNC) of a W-CDMA network. Thus, if the dual standby terminal is simply implemented by adding another SIM card slot on the conventional terminal architecture, it will potentially miss calls or incoming communications that are attempted on the inactive mode while the terminal is operating in the active mode.

SUMMARY OF THE INVENTION

In embodiments of this invention, a system and method having a multimode wireless communication terminal with at least two SIM card slots are described. By revising the traditional multimode terminal architecture, the system can enable at least two phone numbers online at the same time (dual standby). The system includes a main controller, a primary mode module, a secondary mode module, and an inter-system measurement module. The main controller operates the multimode wireless communication terminal in one of a primary mode of operation and a secondary mode of operation. The primary mode module enables the primary mode of operation for the multimode wireless communication terminal. The primary mode of operation is a default mode of operation. The secondary mode module enables the secondary mode of operation for the multimode wireless communication terminal. The inter-system measurement module monitors paging information for the secondary mode of operation at its respective monitoring rates using a time division multiplexed (TDM) method with the primary mode of operation. Embodiments of the system also include an inter-system handover module to initiate a switch from the primary mode of operation to the secondary mode of operation in response to the paging information for the secondary mode of operation indicative of an incoming communication via the secondary mode of operation. The multimode wireless communication terminal is used in a multimode wireless communication system. Embodiments of this system, and the accompanying methods, facilitate a dual standby feature for a traditional multimode wireless communication terminal.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF EXEMPLARY EMBODIMENTS

A technique, according to an embodiment, for implementing a dual standby state enabled wireless communication terminal involves monitoring the paging information for both a primary mode and a secondary mode. An inter-system handover is utilized to switch between the primary mode and the secondary mode. However, it should be noted that some embodiments may implement multimode wireless communication terminals capable of operating with more than two modes. Regardless of the nomenclature used, the primary mode is the default mode in the dual standby terminal. Also, it should be noted that the modes designated as primary and secondary modes may change or swap over time depending on the activity detected or initiated via each available mode of operation. For example, one mode of operation may be designated as the primary mode of operation for a time and then, at a later time, be designated as the secondary mode of operation.

In some embodiments, the dual standby state enabled wireless communication terminal functions similar to a conventional dual mode terminal having only one SIM card installed. However, the limitations of conventional dual mode terminals are overcome by enabling dual standby feature with inter-system measurements and handover functions.

Figure 1:
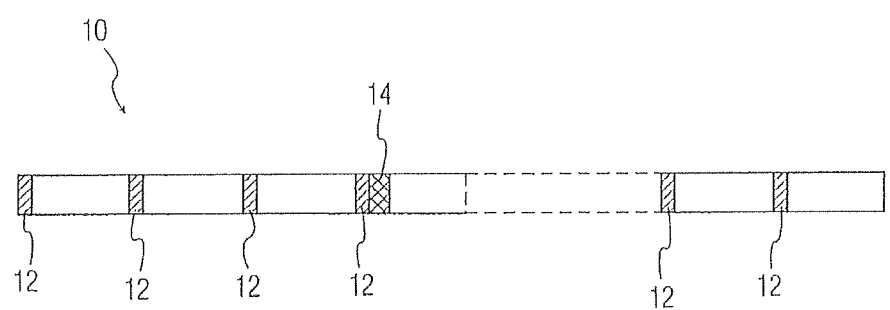
FIG. 1 depicts an exemplary paging scheme for a conventional single standby multimode wireless terminal.
Figure 2:
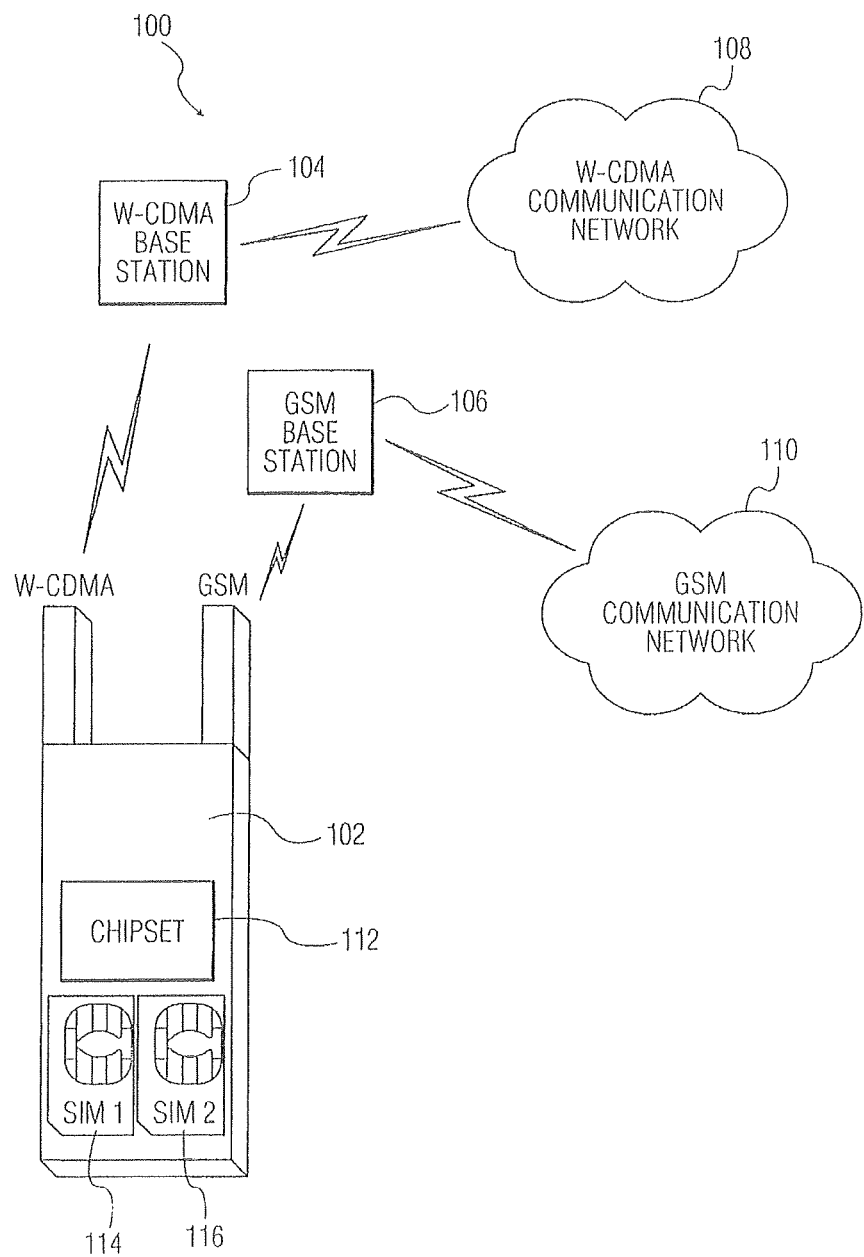
FIG. 2 depicts a schematic block diagram of one embodiment of a dual standby enabled multimode wireless communication system.

FIG. 2 depicts a schematic block diagram of one embodiment of a multimode wireless communication system 100. For convenience, the multimode wireless communication system 100 is described as implementing W-CDMA and GSM wireless communication schemes. However, other embodiments of the multimode wireless communication system 100 may facilitate other wireless communication schemes. Additionally, some embodiments of the multimode wireless communication system 100 may facilitate more than two wireless communication schemes.

The illustrated multimode wireless communication system 100 includes a multimode wireless communication terminal 102, a W-CDMA base station 104 (i.e., a radio network controller (RNC)), a GSM base station 106 (i.e., a base station controller (BSC) or a base transceiver station (BTS)), a W-CDMA communication network 108, and a GSM communication network 110. The depicted multimode wireless communication terminal 102 includes a single chipset 112 and a SIM card for each wireless communication scheme. For example, a SIM card 114 may facilitate wireless communications using W-CDMA, and another SIM card 116 may facilitate wireless communications using GSM. The chipset 112 performs functions to facilitate wireless communications using the SIM cards 114 and 116.

Figure 5:
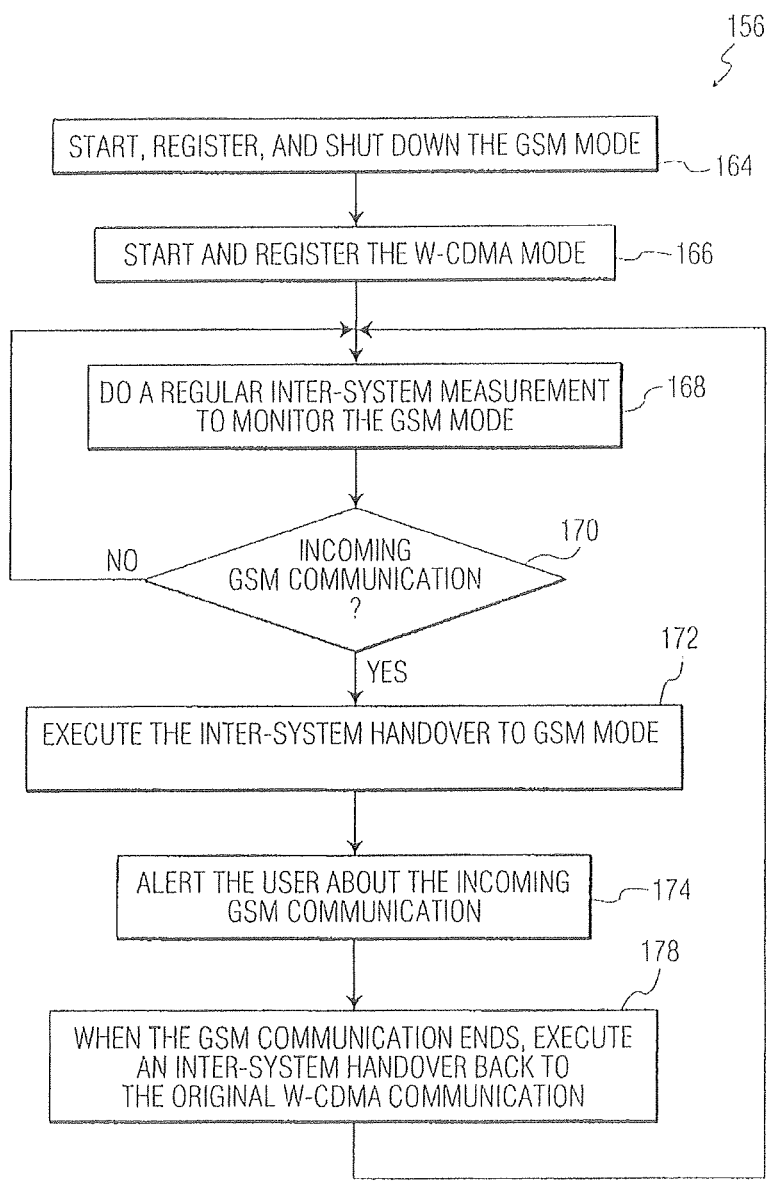
FIG. 5 depicts flowchart of an embodiment of a method for operating the multimode wireless communication system of FIG. 2 in a W-CDMA primary dual standby state.

When the multimode wireless communication terminal 102 is operating in the W-CDMA primary mode, the multimode wireless communication terminal 102 sends wireless transmissions to and receives wireless transmissions from the W-CDMA base station 104, which communicates with another terminal or user (not shown). While the multimode wireless communication terminal 102 is operating in the W-CDMA mode, the multimode wireless communication terminal 102 also regularly receives paging information via the GSM base station 106 and the GSM communication network 110. If GSM paging information is received, then the multimode wireless communication terminal 102 may switch from the W-CDMA mode to the GSM mode to receive an incoming communication via the GSM communication network 110. This operating mode is referred to as the W-CDMA primary dual standby state because the default operating mode of the multimode wireless communication terminal 102 is W-CDMA and the secondary mode of the multimode wireless communication terminal 102 is GSM. Additional details of the W-CDMA primary dual standby state are shown in FIG. 5 and described in more detail below.

Figure 6:
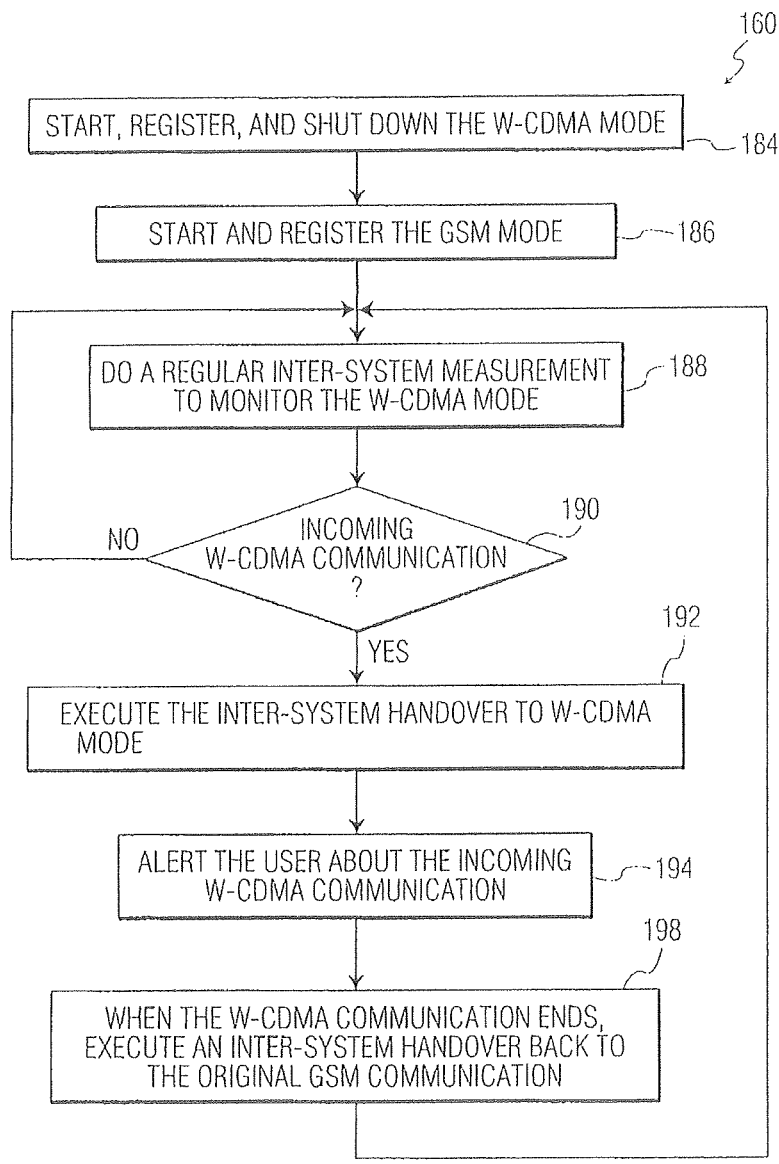
FIG. 6 depicts a flowchart of an embodiment of a method for operating the multimode wireless communication system of FIG. 2 in a GSM primary dual standby state.

When the multimode wireless communication terminal 102 is operating in the GSM primary mode, the multimode wireless communication terminal 102 sends wireless transmissions to and receives wireless transmissions from the GSM base station 106, which communicates with another terminal or user (not shown). While the multimode wireless communication terminal 102 is operating in the GSM mode, the multimode wireless communication terminal 102 also regularly receives paging information via the W-CDMA base station 104 and the W-CDMA communication network 108. If W-CDMA paging information is received, then the multimode wireless communication terminal 102 may switch from the GSM mode to the W-CDMA mode to receive an incoming communication via the W-CDMA communication network 108. This operating mode is referred to as the GSM primary dual standby state because the default operating mode of the multimode wireless communication terminal 102 is GSM and the secondary mode of the multimode wireless communication terminal 102 is W-CDMA. Additional details of the GSM primary dual standby state are shown in FIG. 6 and described in more detail below.

Figure 3:
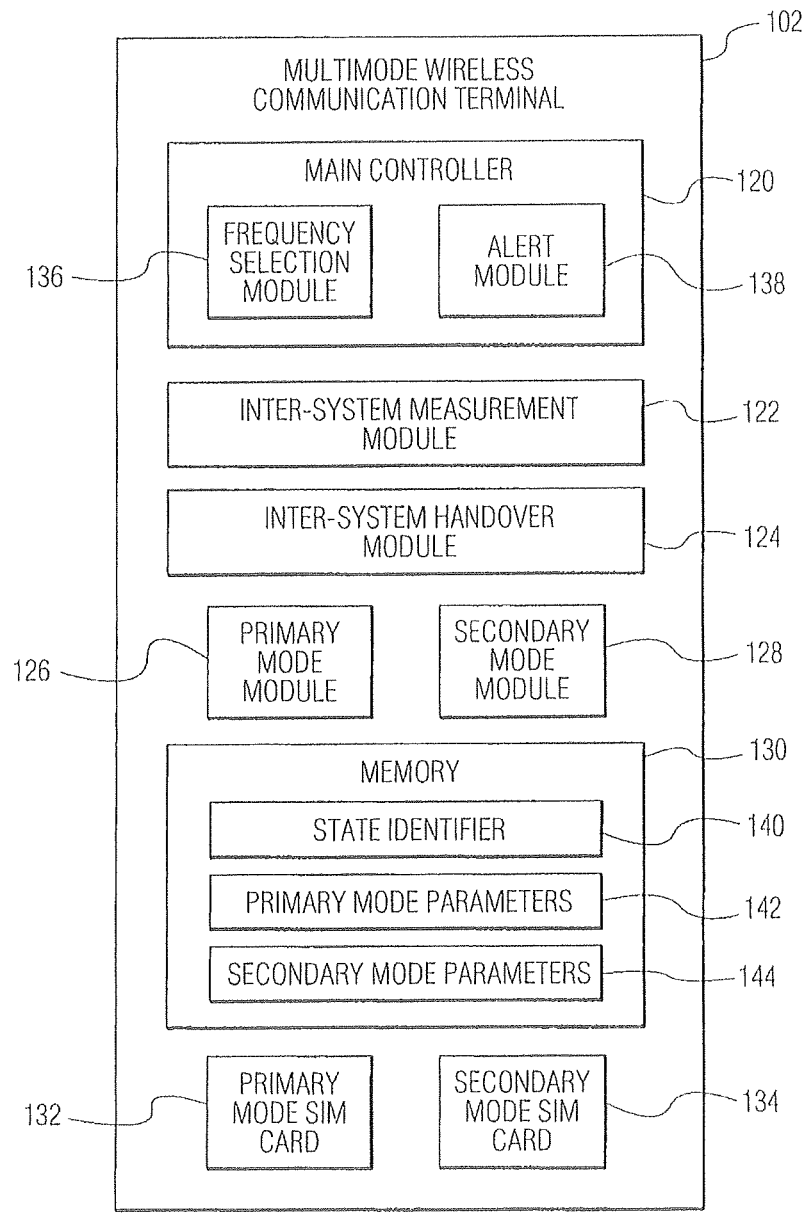
FIG. 3 depicts a schematic block diagram of one embodiment of the multimode wireless communication terminal of FIG. 2.

FIG. 3 depicts a schematic block diagram of one embodiment of the multimode wireless communication terminal 102 of FIG. 2. Although the illustrated multimode wireless communication terminal 102 is shown and described with specific components and functionality, other embodiments of the multimode wireless communication terminal 102 may include fewer or more components and may implement more or less functionality.

The illustrated multimode wireless communication terminal 102 includes a main controller 120, an inter-system measurement module 122, an inter-system handover module 124, a primary mode module 126, and a secondary mode module 128. It should be noted that the modules describe herein may be implemented in hardware or, alternatively, as a combination of software stored on hardware and executed, at least in part, by hardware. The illustrated multimode wireless communication terminal 102 also includes a memory device 130, a primary mode SIM card 132, and a secondary mode SIM card 134. The SIM cards 132 and 134 are substantially similar to the SIM cards 114 and 116 of FIG. 2.

In one embodiment, the main controller 120 operates the multimode wireless communication terminal 102 in one of a primary mode of operation and a secondary mode of operation. The chipset 112 shown in FIG. 2 may be used to implement the main controller 120. Additionally, the SIM cards 114 and 116 may facilitate the primary and secondary modes of operation.

As an example, the main controller 120 may operate the multimode wireless communication terminal 102 in a W-CDMA primary mode with a GSM secondary mode. As another example, the main controller 120 may operate the multimode wireless communication terminal 102 in a GSM primary mode with a W-CDMA secondary mode. In some embodiments, the main controller 120 selects the operation manner for operating the multimode wireless communication terminal 102 from among several modes of operation, including but not limited to a single standby state of operation (i.e., a conventional terminal according to conventional technical specifications), the W-CDMA primary dual standby state of operation, and the GSM primary dual standby state of operation. In regard to the single standby state of operation, the multimode wireless communication terminal 102 may operate similar to a traditional WCDMA/GSM dual mode terminal with only one active SIM identity. In other words, the multimode wireless communication terminal 102 may act as a traditional WCDMA/GSM dual mode terminal with only one active SIM identity. Other embodiments of the main controller 120 may implement other operating states.

In one embodiment, the main controller 120 also includes a frequency selection module 136 and an alert module 138. The frequency selection module 136 stores a frequency selection message for the multimode wireless communication terminal 102 within the multimode wireless communication system 100. The frequency selection message indicates a frequency for use in monitoring the paging information for the secondary mode of operation. In one embodiment, the alert module 138 generates an alert for a user about an incoming communication via the secondary mode of operation during operation in the primary mode of operation and/or during an ongoing communication via the primary mode of operation. For example, the alert module 138 alerts a user to an incoming communication in the GSM mode while the multimode wireless communication terminal 102 is operating in the W-CDMA mode.

In one embodiment, the primary mode module 126 enables the primary mode of operation for the multimode wireless communication terminal 102. As explained above, the primary mode of operation is a default mode of operation. Similarly, the secondary mode module 128 enables the secondary mode of operation for the multimode wireless communication terminal 102.

Figure 7:
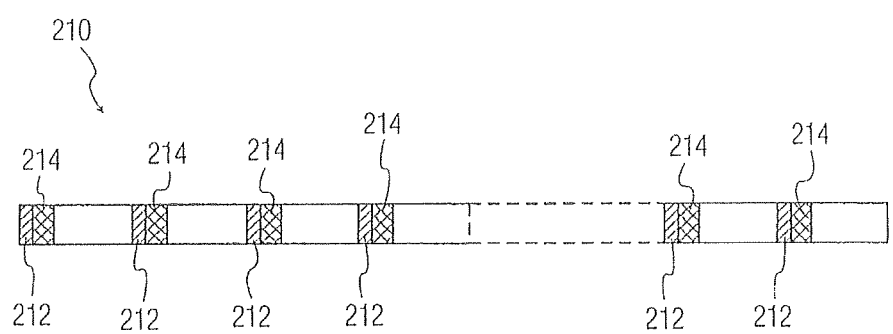
FIG. 7 depicts an embodiment of a paging scheme for a dual standby state enabled wireless communication terminal.

In one embodiment, the inter-system measurement module 122 monitors paging information for the secondary mode of operation. In particular, the inter-system measurement module 122 monitors the paging information for the secondary mode of operation at its monitoring rate using a time division multiplexed (TDM) method with the primary mode. An example of the monitoring performed by the inter-system measurement module 122 is shown in FIG. 7 and described in more detail below.

In one embodiment, the inter-system handover module 124 switches the multimode wireless communication terminal 102 between the primary mode of operation and the secondary mode of operation. More specifically, the inter-system handover module 124 initiates a switch from the primary mode of operation to the secondary mode of operation in response to the paging information for the secondary mode. For example, if the paging information for the GSM mode indicates of an incoming communication or telephone call via the GSM mode, then the inter-system handover module 124 may initiate a handover from the W-CDMA mode to the GSM mode to receive the incoming GSM communication. Similarly, if the paging information for the W-CDMA mode indicates an incoming communication while the multimode wireless communication terminal 102 is operating in the GSM primary dual standby state, then the inter-system handover module 124 may initiate a handover from the GSM mode to the W-CDMA mode to receive the incoming W-CDMA communication.

In one embodiment, the memory device 130 stores data and/or instructions that may be used in the operations of the multimode wireless communication terminal 102. The memory device 130 may be a volatile or non-volatile memory device depending on the implementation of the multimode wireless communication terminal 102. Some exemplary memory devices include, but are not limited to, random access memory (RAM), read only memory (ROM), and other known types of memory devices. In one embodiment, the memory device 130 stores a state identifier 140 to indicate the state of operation for operating the multimode wireless communication terminal 102. This state identifier 140 is a modifiable identifier to show the current operating state of the multimode wireless communication terminal 102 such as the traditional single standby state, the W-CDMA primary dual standby state, the GSM primary dual standby state, or another state of operation.

The memory device 130 also may store primary mode parameters 142 related to a public land mobile network (PLMN) selection, a cell selection, and a registration of the primary mode of operation. The memory device 130 also may store secondary mode parameters 144 related to a PLMN selection, a cell selection, and a registration of the secondary mode of operation. In an alternative embodiment, parameters related to the primary and secondary modes of operation may be stored in the primary mode SIM card 132 and secondary mode SIM card 134, respectively.

It should be noted that the illustrated multimode wireless communication terminal 102 is capable of establishing the frequency setting for the monitored secondary mode of operation in the dual standby environment. Additionally, the illustrated multimode wireless communication terminal 102 is capable of generating inter-system measurement and handover commands by itself. This type of operation contrasts with conventional systems in which measurement and handover commands originate from the network side of the system.

Figure 4:
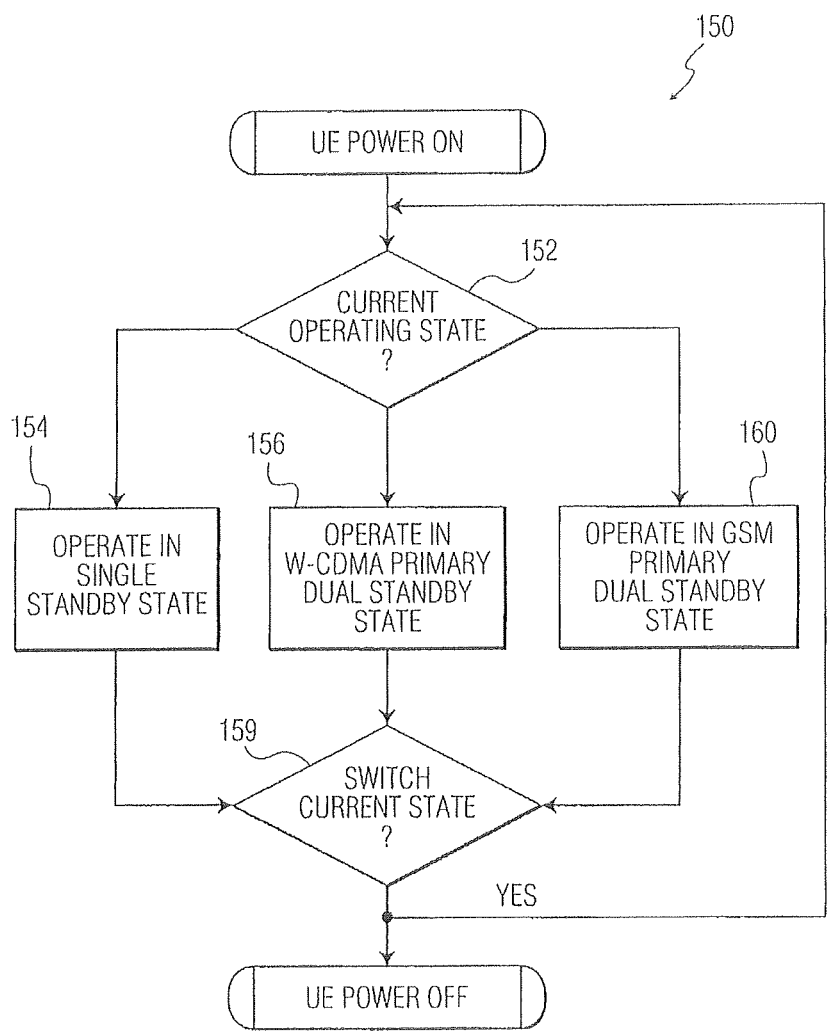
FIG. 4 depicts a flowchart of an embodiment of a method for implementing a dual standby feature in the multimode wireless communication system of FIG. 2.

FIG. 4 depicts a flowchart of an embodiment of a method 150 for enabling a dual standby feature in the multimode wireless communication system 100 of FIG. 2. Although the dual standby method 150 is described in conjunction with the multimode wireless communication system 100 of FIG. 2, other embodiments of the dual standby method 150 may be implemented in conjunction with other types of multimode wireless communication systems.

In the illustrated embodiment, the multimode wireless communication terminal 102 (also referred to as user equipment (UE)) is powered on. At block 152, the current operating state of the multimode wireless communication terminal 102 is determined. In one embodiment, the multimode wireless communication terminal 102 operates in one of three states: the conventional single standby state (block 154), the W-CDMA primary dual standby state (block 156), and the GSM primary dual standby state (block 160). If, at block 159, the terminal user inputs an order to alter the current operating state, the multimode wireless communication terminal 102 will update the state identifier 140 and then operate in the new state until the multimode wireless communication terminal 102 is powered off.

Upon invoking a power off sequence to power off the multimode wireless communication terminal 102, the multimode wireless communication terminal 102 may shut down both the primary and the secondary modes of operation. In one example, the multimode wireless communication terminal 102 sends a power off signal to the W-CDMA communication network 108 and then executes an inter-system handover to the GSM mode to send a power off signal to the GSM communication network 110. Alternatively, the multimode wireless communication terminal 102 sends a power off signal to the GSM communication network 110 and then executes an inter-system handover to the W-CDMA mode to send a power off signal to the W-CDMA communication network 108.

FIG. 5 depicts a process flow diagram of an embodiment of the method 156 for operating the multimode wireless communication system 100 of FIG. 2 in a W-CDMA primary dual standby state. Although the W-CDMA primary dual standby state method 156 is described in conjunction with the multimode wireless communication system 100 of FIG. 2, other embodiments of the W-CDMA primary dual standby state method 156 may be implemented in conjunction with other types of multimode wireless communication systems.

In one embodiment, the W-CDMA primary dual standby state method 156 begins after the multimode wireless communication terminal 102 is powered on. The W-CDMA primary dual standby state may be a default state of operation for the multimode wireless communication terminal 102 or may be a state of operation selected by a user. At block 164, the multimode wireless communication terminal 102 starts, registers, and shuts down the GSM mode of operation. Although the primary mode of operation for the multimode wireless communication terminal 102 is the W-CDMA mode, in this embodiment, the multimode wireless communication terminal 102 starts the GSM mode to enable public land mobile network (PLMN) selection and cell selection in the GSM mode. The multimode wireless communication terminal 102 also registers and gets GSM information related to the selected cell. In one embodiment, the GSM information related to PLMN selection, cell selection, and registration are stored as secondary mode parameters 144 in the memory device 130 because, in this case, the GSM mode is the secondary mode of operation.

At block 166, the multimode wireless communication terminal 102 starts and registers the W-CDMA mode of operation. In one embodiment, the multimode wireless communication terminal 102 stores W-CDMA information related to PLMN selection, cell selection, and registration as the primary mode parameters 142 in the memory device 130 because, in this case, the W-CDMA mode is the primary mode of operation.

While operating in the W-CDMA primary dual standby state of operation, the multimode wireless communication terminal 102, at block 168, performs regular inter-system measurements to monitor the GSM mode of operation. In one embodiment, the multimode wireless communication terminal 102 monitors paging information for the W-CDMA mode and the GSM mode at their respective monitoring rates using a time division multiplexed (TDM) method. In other words, the multimode wireless communication terminal 102 monitors the paging information for both modes on a regular basis, instead of infrequently monitoring the paging information for the secondary GSM mode. In one embodiment, the main controller 120 invokes the inter-system measurement module 122 to send regular inter-system measurement orders or commands to monitor the GSM mode.

At block 170, the main controller 120 determines from the GSM paging information if there is an incoming communication via the GSM mode of operation. If there is not an incoming GSM communication, then the multimode wireless communication terminal 102 continues to operate in the W-CDMA primary mode and monitor the secondary GSM mode.

If the main controller 120 determines that there is an incoming GSM communication, then at block 172 the main controller 120 invokes the inter-system handover module 124 to execute an inter-system handover to the GSM mode of operation. At block 174, the main controller 120 also invokes the alert module 138 to alert the user about the incoming GSM communication.

Then, after the incoming GSM communication ends at block 178, the main controller 120 invokes the inter-system handover module 124 to execute another inter-system handover back to the W-CDMA mode of operation.

FIG. 6 depicts a flowchart of an embodiment of the method 160 for operating the multimode wireless communication system 100 of FIG. 2 in a GSM primary dual standby state. Although the GSM primary dual standby state method 160 is described in conjunction with the multimode wireless communication system 100 of FIG. 2, other embodiments of the GSM primary dual standby state method 160 may be implemented in conjunction with other types of multimode wireless communication systems.

In one embodiment, the GSM primary dual standby state method 160 begins after the multimode wireless communication terminal 102 is powered on. The GSM primary dual standby state may be a default state of operation for the multimode wireless communication terminal 102 or may be a state of operation selected by a user. At block 184, the multimode wireless communication terminal 102 starts, registers, and shuts down the W-CDMA mode of operation. Although the primary state of operation for the multimode wireless communication terminal 102 is the GSM mode, in this embodiment, the multimode wireless communication terminal 102 starts the W-CDMA mode to enable public land mobile network (PLMN) selection and cell selection in the W-CDMA mode. The multimode wireless communication terminal 102 also registers and gets W-CDMA information related to the selected cell. In one embodiment, the W-CDMA information related to PLMN selection, cell selection, and registration are stored as secondary mode parameters 144 in the memory device 130 because, in this case, the W-CDMA mode is the secondary mode of operation.

At block 186, the multimode wireless communication terminal 102 starts and registers the GSM mode of operation. In one embodiment, the multimode wireless communication terminal 102 stores GSM information related to PLMN selection, cell selection, and registration as the primary mode parameters 142 in the memory device 130 because, in this case, the GSM mode is the primary mode of operation.

While operating in the GSM primary dual standby state of operation, the multimode wireless communication terminal 102, at block 188, performs regular inter-system measurements to monitor the W-CDMA mode of operation. In one embodiment, the multimode wireless communication terminal 102 monitors paging information for the GSM mode and the W-CDMA mode at their respective monitoring rates using a TDM method. In other words, the multimode wireless communication terminal 102 monitors the paging information for both modes on a regular basis, instead of infrequently monitoring the paging information for the secondary W-CDMA mode. In one embodiment, the main controller 120 invokes the inter-system measurement module 122 to send regular inter-system measurement orders or commands to monitor the W-CDMA mode.

At block 190, the main controller 120 determines from the W-CDMA paging information if there is an incoming communication via the W-CDMA mode of operation. If there is not an incoming W-CDMA communication, then the multimode wireless communication terminal 102 continues to operate in the GSM primary mode and monitor the secondary W-CDMA mode.

If the main controller 120 determines that there is an incoming W-CDMA communication, then at block 192 the main controller 120 invokes the inter-system handover module 124 to execute an inter-system handover to the W-CDMA mode of operation. At block 194, the main controller 120 also invokes the alert module 138 to alert the user about the incoming W-CDMA communication.

Then, after the incoming W-CDMA communication ends at block 198, the main controller 120 invokes the inter-system handover module 124 to execute another inter-system handover back to the GSM mode of operation.

FIG. 7 depicts an embodiment of a paging scheme 210 for a dual standby state wireless communication terminal. In particular, the wireless communication terminal 102 receives paging information 212 for the active, or primary, mode on a regular basis. Additionally, the wireless communication terminal 102 receives paging information 214 for the secondary mode on a regular basis.

It should also be noted that the inter-system measurements are initiated by the wireless communication terminal 102 rather than by a vendor-specific algorithm implemented at a base station.

Embodiments of the multimode wireless communication terminal 102 may be implemented in any type of multimode wireless communication system. Additionally, embodiments of the multimode wireless communication terminal 102 and accompanying multimode wireless communication system 100 have a reasonable cost and time-to-market to enable the functionality of the dual standby state of operation as described herein. In fact, much of the functionality of conventional W-CDMA/GSM terminals may be reused. Moreover, embodiments of the multimode wireless communication terminal 102, using the TDM inter-system measurement and handover operations described herein, reduce or eliminate the RF interference that would otherwise result from multiple simultaneously active modules of operation.

Although specific embodiments of the invention have been described and illustrated, the invention is not to be limited to the specific forms or arrangements of parts as described and illustrated herein. The invention is limited only by the claims.

What is claimed is:

1. A method for operating a multimode wireless communication terminal with at least two subscriber identity module (SIM) card slots for use in a multimode wireless communication system, the method comprising:
    initiating a primary mode of operation within the multimode wireless communication terminal, the primary mode of operation being a default mode of operation, wherein initiation of the primary mode of operation is facilitated by a first subscriber identity module (SIM) card;
    initiating a secondary mode of operation within the multimode wireless communication terminal, wherein initiation of the second mode of operation is facilitated by a second SIM card;
    monitoring, by the multimode wireless communication terminal, paging information for the primary mode of operation at a communication network provided primary mode monitoring frequency;
    monitoring, by the multimode wireless communication terminal, paging information for the secondary mode of operation at a secondary mode monitoring frequency established by the multimode wireless communication terminal, wherein monitoring of the paging information for the secondary mode of operation is performed using a time division multiplexed method with monitoring of the paging information for the primary mode; and
    operating the multimode wireless communication terminal in one of the primary and secondary modes of operation while monitoring the paging information for each of the primary and secondary modes of operation.

2. The method of claim 1, further comprising switching from the primary mode of operation to the secondary mode of operation in response to the paging information for the secondary mode of operation indicative of an incoming communication via the secondary mode of operation.

3. The method of claim 2, further comprising implementing, by the multimode wireless communication terminal, an inter-system hand over to switch between the primary mode of operation and the secondary mode of operation.

4. The method of claim 1, further comprising selecting a state for operating the multimode wireless communication terminal from among the following states of operation:
    a single standby state of operation;
    a wideband code division multiple access (W-CDMA) primary dual standby state of operation in which the primary mode is a W-CDMA mode of operation; and
    a global system for mobile communications (GSM) primary dual standby state of operation in which the primary mode is a GSM mode of operation.

5. The method of claim 4, further comprising storing a state identifier to indicate a current state for operating the multimode wireless communication terminal 6. The method of claim 1, further comprising:
    starting up the secondary mode of operation to invoke a public land mobile network (PLMN) selection and a cell selection in the secondary mode and to register the multimode wireless communication terminal in the secondary mode;
    shutting down the secondary mode of operation;
    starting up the primary mode of operation to invoke a PLMN selection and a cell selection in the primary mode and to register the multimode wireless communication terminal in the primary mode; and
    regularly monitoring the paging information for the primary mode of operation while operating in the primary mode of operation and invoking one or more inter-system measurement commands to regularly monitor the paging information for the secondary mode of operation.

7. The method of claim 6, further comprising:
    switching from the primary mode of operation to the secondary mode of operation in response to the paging information for the secondary mode of operation indicative of an incoming communication via the secondary mode of operation;
    generating an alert for a user about the incoming communication via the secondary mode of operation while temporarily operating in the secondary mode of operation;
    switching to the secondary mode of operation in response to a user selection to participate in the incoming communication via the secondary mode of operation; and
    switching back from the secondary mode of operation to the primary mode of operation.

8. The method of claim 1, further comprising storing a frequency selection message, the frequency selection message indicating the secondary mode monitoring frequency for use in monitoring the paging information for the secondary mode of operation.

9. The method of claim 1, further comprising sending an inter-system measurement command within the multimode wireless communication terminal, the inter-system measurement command to acquire paging information for the secondary mode of operation.

10. The method of claim 1, further comprising sending an inter-system hand over command within the multimode wireless communication terminal, the inter-system handover command to initiate an inter-system handover between the primary mode of operation and the secondary mode of operation.

11. A multimode wireless communication terminal for use in a multi mode wireless communication system, the multimode wireless communication terminal comprising:
a main controller to operate the multimode wireless communication terminal in one of a primary mode of operation and a secondary mode of operation, the primary mode of operation being a default mode of operation;
a primary mode module coupled to the main controller, the primary mode module to enable the primary mode of operation for the multimode wireless communication terminal, the primary mode module configured to monitor paging information for the primary mode of operation at a communication network provided primary mode monitoring frequency;
a secondary mode module coupled to the main controller, the secondary mode module to enable the secondary mode of operation for the multimode wireless communication terminal; and
an inter-system measurement module coupled to the main controller, the intersystem measurement module configured to monitor paging information for the secondary mode of operation at a secondary monitoring frequency established by the multimode wireless communication terminal, wherein paging monitoring for the second mode of operation is time division multiplexed with paging monitoring for the primary mode of operation
a single chipset to implement the main controller;
a first subscriber identity module (SIM) card to facilitate the primary mode of operation; and
a second SIM card to facilitate the secondary mode of operation.

12. The multimode wireless communication terminal of claim 11, further comprising an inter-system handover module coupled to the main controller, the inter-system handover module is configured to initiate a switch from the primary mode of operation to the secondary mode of operation in response to the paging information for the secondary mode of operation indicative of an incoming communication via the secondary mode of operation.

13. The multi mode wireless communication terminal of claim 11, further comprising an inter-system hand over module coupled to the main controller, the inter-system handover module being configured to self initiate a switch between the primary mode of operation and the secondary mode of operation.

14. The multi mode wireless communication terminal of claim 11, wherein the main controller is further configured to select the primary mode of operation for operating the multimode wireless communication terminal from among the following modes of operation:
a single standby state of operation;
a wideband code division multiple access (W-CDMA) primary dual standby state of operation in which the primary mode is a W-CDMA mode of operation; and a global system for mobile communications (OSM) primary dual standby state of operation in which the primary mode is a OSM mode of operation.

15. The multimode wireless communication terminal of claim 14, further comprising a memory device coupled to the main controller, the memory device to store:
a state identifier to indicate a current state of operation for operating the multimode wireless communication terminal;
one or more primary mode parameters related to a public land mobile network (PLMN) selection, a cell selection, and a registration of the primary mode of operation; and
one or more secondary mode parameters related to a PLMN selection, a cell selection, and a registration of the secondary mode of operation.

16. The multimode wireless communication terminal of claim 11, further comprising a frequency module coupled to the main controller, the frequency module to store a frequency selection message indicative of secondary monitoring frequency for use in monitoring the paging information for the secondary mode of operation.

17. The multimode wireless communication terminal of claim 11, further comprising an alert module coupled to the main controller, the alert module to generate an alert for a user about an incoming communication via the secondary mode of operation.

18. An apparatus to facilitate a dual standby mode of operation in a multimode wireless communication terminal, the apparatus comprising:
a primary mode module adapted to operate the multimode wireless communication terminal in a primary mode of operation, the primary mode of operation being a default mode of operation;
a first subscriber identity module (SIM) card configured to facilitate operation of the primary mode module in the primary mode of operation;
a secondary mode module adapted to operate the multimode wireless communication terminal in a secondary mode of operation;
a second SIM card configured to facilitate operation of the secondary mode module in the secondary mode of operation; and
an inter-system measurement module adapted to time division multiplex monitoring paging information for the primary mode of operation at a first monitoring rate with monitoring paging information for the secondary mode of operation at a second monitoring rate during operation of the multi mode wireless communication terminal in one of the primary and secondary modes of operation, wherein the first monitoring rate is provided by a communication network provided frequency and the second monitoring rate is established by the apparatus.

19. The apparatus of claim 18, further comprising an inter-system handover module configured to switch between the primary mode of operation and the secondary mode of operation in response to the paging information indicative of an incoming communication via the secondary mode of operation.

* * * * *